(12) United States Patent
Watabe

(10) Patent No.: US 7,928,149 B2
(45) Date of Patent: Apr. 19, 2011

(54) PRECIOUS METAL COLLOID, PRECIOUS METAL FINE-PARTICLE, COMPOSITION, AND METHOD FOR PRODUCING PRECIOUS METAL FINE-PARTICLE

(75) Inventor: Masatoshi Watabe, Tokyo (JP)

(73) Assignee: Tama-Tlo, Ltd., Hachioji-shi, Tokyo (JP)

( * ) Notice: Subject to any disclaimer, the term of this patent is extended or adjusted under 35 U.S.C. 154(b) by 428 days.

(21) Appl. No.: 10/569,509

(22) PCT Filed: Jun. 21, 2004

(86) PCT No.: PCT/JP2004/009063
§ 371 (c)(1),
(2), (4) Date: Dec. 18, 2006

(87) PCT Pub. No.: WO2005/023468
PCT Pub. Date: Mar. 17, 2005

(65) Prior Publication Data
US 2007/0186725 A1    Aug. 16, 2007

(30) Foreign Application Priority Data

Aug. 28, 2003  (JP) .................................. 2003-304547
Dec. 26, 2003  (JP) .................................. 2003-432661

(51) Int. Cl.
*B01F 3/12*  (2006.01)
*B01F 3/20*  (2006.01)
(52) U.S. Cl. .................... 516/97; 516/20; 516/77; 252/1
(58) Field of Classification Search ............. 516/97
See application file for complete search history.

(56) References Cited

U.S. PATENT DOCUMENTS 4,204,869 A  *  5/1980  Byers et al. ................... 430/564

FOREIGN PATENT DOCUMENTS

| EP | 0426300 A1 | 5/1991 |
| JP | 58-91103 A | 5/1983 |
| JP | 62-121640 A | 6/1987 |
| JP | 2002-180110 A | 6/2002 |
| JP | 2002-245854 | * 8/2002 |
| JP | 2002-245854 A | 8/2002 |
| WO | 2004/076104 A1 | 9/2004 |

OTHER PUBLICATIONS

Templeton et al., "Monolayer-Protected Cluster Molecules", Accounts of Chemical Research, vol. 33, No. 1, 2000, pp. 27-36.*
Chinese Office Action dated Jun. 20, 2008, issued in corresponding Chinese Patent U.S. Appl. No. 200480031539.8.
International Search Report of International Application PCT/JP2004/009063 mailed Sep. 28, 2004.
Supplementary European Search Report issued Aug. 18, 2009 in corresponding European Patent Application No. 04746532.

* cited by examiner

*Primary Examiner* — Ling-Siu Choi
*Assistant Examiner* — Chun-Cheng Wang
(74) *Attorney, Agent, or Firm* — Westerman, Hattori, Daniels & Adrian, LLP

(57) ABSTRACT

To provide a precious metal colloid enabling a production in simply and in low cost, a long-term storage, and a formation of a thin film having a high conductivity, a precious metal fine-particle, a composition including the same, and a method for producing a precious metal fine-particle for forming such precious metal colloid, which is a precious metal colloid in which a protection component protects a precious metal fine-particle selected from gold, silver, platinum, and palladium, a precious metal colloid in which the maximum peak of $^{13}$C-NMR spectrum of the protection component separated from the precious metal colloid by ultracentrifugation treatment presents in 160 to 190 ppm other than peaks of a primary carbon and an aromatic carbon, or a precious metal colloid in which peaks of $^{13}$C-NMR spectrum present in 20 to 90 ppm and 160 to 190 ppm. A reduction agent, such as a peptide or other amino acid compound and glucosamine, and alkali for supporting a reductivity of the reduction agent are added to a solution dissolving a precious metal containing compound to form the precious metal fine-particle by a reduction reaction of a precious metal ion in the precious metal containing compound.

16 Claims, 9 Drawing Sheets

1 : Au(TRIGLYCINE + ALKALI)
2 : Au(CITRIC ACID + TRIGLYCINE)
3 : Au(CITRIC ACID + TANNIC ACID)
4 : Au(CITRIC ACID + GLUCOSAMINE)

1 Au(TRIGLYCINE + ALKALI)
2 Au( TRIGLYCINE + ALKALI)
3 Pd( TRIGLYCINE + ALKALI)
4 Ag(GLUCOSAMINE + ALKALI)
5 Pt( TRIGLYCINE + ALKALI)
6 Au (CITRIC ACID)
7 Pt( TRIGLYCINE + ALKALI)

PRECIOUS METAL COLLOID, PRECIOUS METAL FINE-PARTICLE, COMPOSITION, AND METHOD FOR PRODUCING PRECIOUS METAL FINE-PARTICLE

TECHNICAL FIELD

The present invention relates to a precious metal colloid, a precious metal fine-particle, a composition, and a method for producing the same, particularly, relates to a precious metal fine-particle selected from gold, silver, platinum, and palladium, a precious metal colloid or a composition thereof, and a method for producing the same in a solution made of a water solution, or an alcohol or other organic solvent.

BACKGROUND ART

A metal nanoparticle having a particle diameter of about 1 to 200 nm has been paid attention in various properties such as an electrical property, a magnetic property, or a catalyst property, and has been expected with applications in various fields.

A metal colloid obtained by dispersing a nanoparticle of a precious metal ouch as gold in a dispersion medium, has a photo absorption property called "plasmon absorption" generated by a plasma vibration of an electron, so it has a color characteristic of the respective metal elements.

A gold colloid for example has the above described plasmon absorption near 520 nm and expresses a go-called wine red color.

The above described gold colloid for example is applied to a coating material in which a solution containing the colloid is coated and heated to form a gold plate, a pregnancy test agent obtained by bonding an antibody, and biosensing such as a genetic tooting for detecting a DNA having a specified nucleotide sequence. And, by coating and drying the gold colloid, a fine line as a thin film or a wire of gold can be formed.

The precious metal colloid such as the gold colloid described above has a weak affinity between a dispersed phase of a precious metal fine-particle and the dispersion medium of water, so it is unstable and will be prone to cause a flocculation when an electrolyte presents.

Then, for preventing the flocculation, it is demanded to add a large amount of a protection agent having a function for stabilizing the precious metal colloid.

However, when the precious metal colloid containing the large amount of the protection agent made of mainly polymer, is coated and dried as described above in forming a conductive thin film, the protection agent without a conductivity obstructs the conductivity. Therefore, the film is demanded to perform a high temperature treatment to decompose an organic matter. However, due to such high temperature treatment, a dimensional precision of the conductive thin film will be lowered.

While the application of the gold colloid as described above has been spread, a method for producing the gold colloid in simple and low cost has been demanded.

Japanese Unexamined patent Application (Kokai) No. 2001-192712 for example discloses a method for reducing a center metal by a reduction elimination of ligand from a quaternary ammonium salt metal complex compound to form a metal nanoparticle.

However, there is disadvantage that it is demanded to compose a specified compound such as the quaternary ammonium salt metal complex compound, which is difficult to produce easily.

Japanese Unexamined patent Application (Kokai) No. 11-76800 discloses a method for dissolving a metal compound in a solvent, adding a polymer pigment dispersion agent, adding an alkanolamine or other amines as a reduction agent, and reducing the metal to form the metal colloid protected by the polymer pigment dispersion agent.

However, there are disadvantages that the production is not easy due to using alkanolamine or other strong toxicity agents and a reduction of a production cost is difficult due to using the polymer pigment dispersion agent or other materials which is hard to obtain.

Japanese Unexamined patent Application (Kokai) No. 11-80647 discloses a method for using a polymer pigment dispersion agent having a specified structure of 2,000 to 1,000,000 in average molecular weight and an alcohol as the reduction agent to form a precious metal or copper colloid used to a colorant having a high chroma.

An example in Japanese Unexamined patent Application (Kokai) No. 10-66861 discloses a method for using silver nitrate as a metal compound, sodium citrate as a dispersion agent, and ferrous sulfate or tannic acid a the reduction agent and mixing them under stirring in 2,000 to 6,000 rpm to form a silver colloid.

By the above two methods, however, a thin film having a high conductivity is not able to be obtained.

An example in Japanese Unexamined patent Application (Kokai) No. 2002-245854 discloses a method for using a compound having an amino group and a carboxyl group, such as an amino acid, as the protection agent and reducing the precious metal by tannic acid.

It is disclosed that a precious metal colloid obtained by the above method has a stability enabling a conductive ink. The precious metal colloid however is gradually deposited, so it is not suitable for a long-term storage.

In the above way, a combination of well-known start materials suffers from disadvantages that a desired high conductivity is not obtained in forming the thin film, a reaction is carried out at a production condition having a lot of restrictions for an uniform dispersion, and the conductivity is sacrificed when the polymer pigment dispersion agent is used to obtain a high dispersability.

DISCLOSURE OF THE INVENTION

The present invention was made in consideration of the above discussions, no the present invention has as its object to provide a gold colloid or other precious metal colloid formed in simply and in low cost, and enabling a long-term storage and a formation of a thin film having a high conductivity, a precious metal fine-particle, a composition containing the same, a method for producing the precious metal fine-particle for forming the precious metal colloid.

To achieve the above object, there is provided a precious metal colloid in which a protection component protects a precious metal fine-particle selected from gold, silver, platinum and palladium, wherein, in $^{13}$C-NMR (nuclear magnetic resonance) spectrum of the protection component separated from the precious metal colloid by ultracentrifugation treatment, a maximum peak presents in 160 to 190 ppm other than peaks of a primary carbon and an aromatic carbon.

According to the above precious metal colloid in the present invention, preferably the protection component is an oxide of a peptide.

To achieve the above object, there is provided a precious metal colloid in which a protection component protects a precious metal fine-particle selected from gold, silver, platinum and palladium, wherein, in $^{13}$C-NMR spectrum of the protection component separated from the precious metal colloid by ultracentrifugation treatment, peaks present in 20 to 90 ppm and 160 to 190 ppm.

According to the above precious metal colloid in the present invention, preferably the protection component is an oxide of a glucosamine compound.

To achieve the above object, there is provided a precious metal colloid in which a protection component protects a precious metal fine-particle selected from gold, silver, platinum and palladium, wherein a standard deviation of a particle diameter of the precious metal fine-particle is 15% or less.

According to the above precious metal colloid in the present invention, preferably the particle diameter of the precious metal fine-particle is 1 to 200 nm.

To achieve the above object, there is provided a precious metal colloid in which a protection component protects a precious metal fine-particle selected from gold, silver, platinum and palladium, returning to a colloid state when added with water or organic solvent after coated and dried.

According to the above precious metal colloid in the present invention, preferably the precious metal fine-particle is formed by mixing a compound A expressed by the following formula (1) or (2) as the reduction agent and an alkali for supporting a reductivity of the compound A in a solution dissolving a precious metal containing compound containing a precious metal selected from gold, silver, platinum, and palladium, and by a reduction reaction of a precious metal ion in the precious metal containing compound,

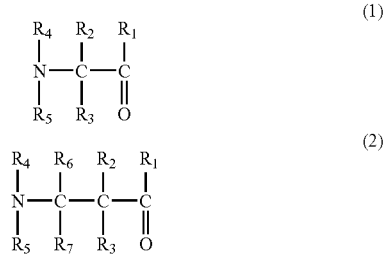

Where, $R_1$ indicates a hydrogen, a hydroxyl group, an alkoxy group, an amino group or an atomic group bonded by a peptide bonding,
  each of $R_2$ and $R_3$ indicates a hydrogen, an alkyl group, or a substituted alkyl group,
  each of $R_4$ and $R_5$ indicates a hydrogen, an alkyl group, a substituted alkyl group, or an acetyl group, and
  each of $R_6$ and $R_7$ indicates a hydrogen, an alkyl group, or a substituted alkyl group.

According to the above precious metal colloid in the present invention, more preferably the solution is a water solution.

More preferably, the alkali is added so that pH of the water solution becomes 10 or more, further preferably pH of the water solution in controlled to be 7 or more after forming the precious metal fine-particle.

Preferably, the solution is an alcohol solution.

To achieve the above object, there is provided a precious metal fine-particle having an oxide of an organic compound, in which a maximum peak in $^{13}$C-NMR (nuclear magnetic resonance) spectrum presents in 160 to 190 ppm other than peaks of a primary carbon and an aromatic carbon, on a surface of the precious metal fine-particle selected from gold, silver, platinum and palladium.

To achieve the above object, there is provided a precious metal fine-particle having an oxide of a peptide, in which a maximum peak in $^{13}$C-NMR (nuclear magnetic resonance) spectrum presents in 160 to 190 ppm other than peaks of a primary carbon and an aromatic carbon, on a surface of the precious metal fine-particle selected from gold, silver, platinum and palladium.

To achieve the above object, there is provided a composition having a precious metal fine-particle having an oxide of an organic compound, in which a maximum peak in $^{13}$C-NMR (nuclear magnetic resonance) spectrum presents in 160 to 190 ppm other than peaks of a primary carbon and an aromatic carbon, on a surface of the precious metal fine-particle selected from gold, silver, platinum, and palladium, and a dispersion medium.

To achieve the above object, there is provided a composition comprising a precious metal fine-particle having an oxide of a peptide, in which a maximum peak in $^{13}$C-NMR (nuclear magnetic resonance) spectrum presents in 160 to 190 ppm other than peaks of a primary carbon and an aromatic carbon, on a surface of the precious metal fine-particle selected from gold, silver, platinum and palladium, and a dispersion medium.

To achieve the above object, there is provided a precious metal fine-particle having an oxide of an organic compound, in which peaks in $^{13}$C-NMR (nuclear magnetic resonance) spectrum present in 20 to 90 ppm and 160 to 190 ppm, on a surface of the precious metal fine-particle selected from gold, silver, platinum, and palladium.

To achieve the above object, there is provided a precious metal fine-particle having an oxide of a glucosamine compound, in which peaks in $^{13}$C-NMR (nuclear magnetic resonance) spectrum present in 20 to 90 ppm and 160 to 190 ppm, on a surface of the precious metal fine-particle selected from gold, silver, platinum, and palladium.

To achieve the above object, there is provided a composition comprising a precious metal fine-particle having an oxide of an organic compound, in which peaks in $^{13}$C-NMR (nuclear magnetic resonance) spectrum present in 20 to 90 ppm and 160 to 190 ppm, on a surface of the precious metal fine-particle selected from gold, silver, platinum, and palladium, and a dispersion medium.

To achieve the above object, there is provided a component comprising a precious metal fine-particle having an oxide of a glucosamine compound, in which peaks in $^{13}$C-NMR (nuclear magnetic resonance) spectrum present in 20 to 90 ppm and 160 to 190 ppm, on a surface of the precious metal fine-particle selected from gold, silver, platinum, and palladium, and a dispersion medium.

To achieve the above object, there is provided a method for producing a precious metal fine-particle having the steps of: adding a compound A expressed by the following formula (1) or (2) as a reduction agent in a solution dissolving a precious metal containing compound containing a precious metal selected from gold, silver, platinum and palladium; adding an alkali for supporting a reductivity of the compound A in the solution; and forming a precious metal fine-particle by a reduction reaction of a precious metal ion in the precious metal containing compound.

-continued

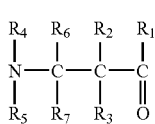

Where, $R_1$ indicates a hydrogen, a hydroxyl group, an alkoxy group, an amino group or an atomic group bonded by a peptide bonding, each of $R_2$ and $R_3$ indicates a hydrogen, an alkyl group, or a substituted alkyl group, each of $R_4$ and $R_5$ indicates a hydrogen, an alkyl group, a substituted alkyl group, or an acetyl group, and each of $R_6$ and $R_7$ indicates a hydrogen, an alkyl group, or a substituted alkyl group.

According to the above method for producing a precious metal fine-particle in the present invention, preferably the compound A is a peptide.

Preferably, the compound A is a glucosamine compound.

According to the above method for producing a precious metal fine-particle in the present invention, preferably the solution is a water solution.

Preferably, in the step of adding the alkali, the alkali is added so that pH of the water solution becomes 10 or more.

More preferably, in the step of forming the precious metal fine-particle, the precious metal fine-particle in dispersed in the water solution to form a precious metal colloid.

More preferably, the method for producing a precious metal fine-particle further has the steps of separating the water solution into a precipitate and a top clear layer by centrifugation, and removing the top clear layer and extracting the precipitate after the stop of forming the precious metal fine-particle and forming a precious metal colloid.

According to the above method for producing a precious metal fine-particle in the present invention, preferably the solution is a solution of an organic solvent.

More preferably, the method for producing a precious metal fine-particle further has further the steps of placing statically and separating the solution into a precipitate and a top clear layer, and removing the top clear layer and extracting the precipitate after the step of forming the precious metal fine-particle.

More preferably, the method for producing a precious metal fine-particle further has the step of adding water to the precipitate to form a water based precious metal colloid after removing the top clear layer and extracting the precipitate.

More preferably, the method for producing a precious metal fine-particle further has the stop of concentrating the precious metal colloid by ultrafilteration or ultracentrifugation after the step of forming the precious metal colloid.

More preferably, the method for producing a precious metal fine-particle further has the steps of adding an organic solvent protection agent in the solution, and adding an organic solvent to the precipitate to form an organic solvent based precious metal colloid after removing the top clear layer and extracting the precipitate.

BEST NODE FOR CARRYING OUT THE INVENTION

Hereinafter, embodiments of a method for producing a precious metal colloid and a precious metal fine-particle according to the present invention will be described with reference to the drawings.

First Embodiment

In the present embodiment, a precious metal colloid will be described, in which a protection component protects a precious metal fine-particle (hereinafter, also referred to a precious metal nanoparticle) selected from gold, silver, platinum, and palladium and having a particle diameter of 1 to 200 nm, which is dispersed in water.

Figure 1A:
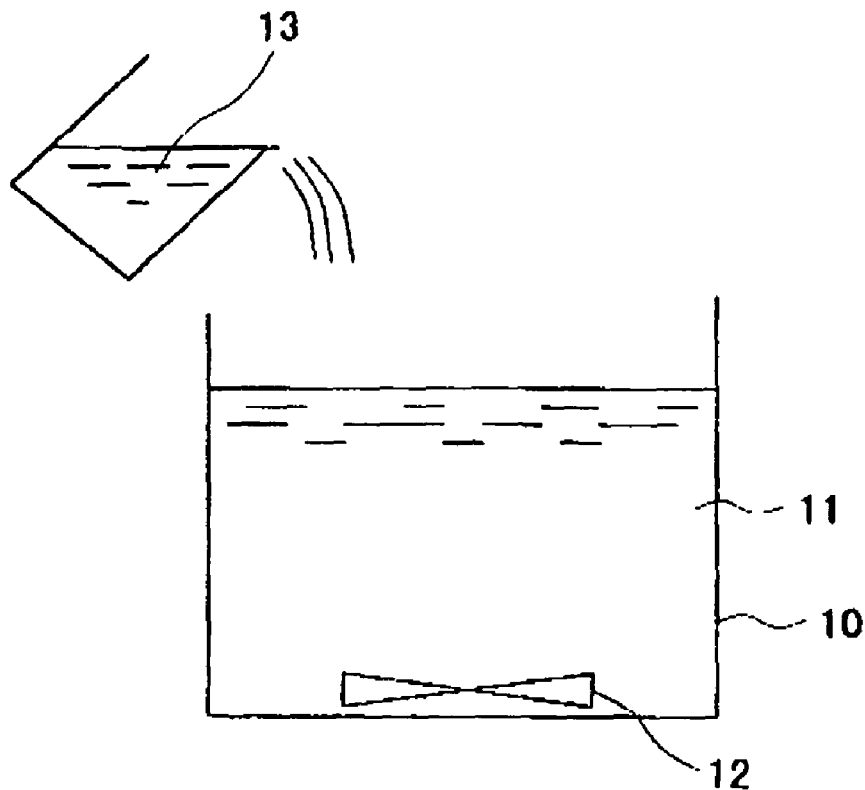
FIGS. 1A and 1B are schematic views illustrating a method for producing a precious natal fine-particle according to the first embodiment.
Figure 1B:
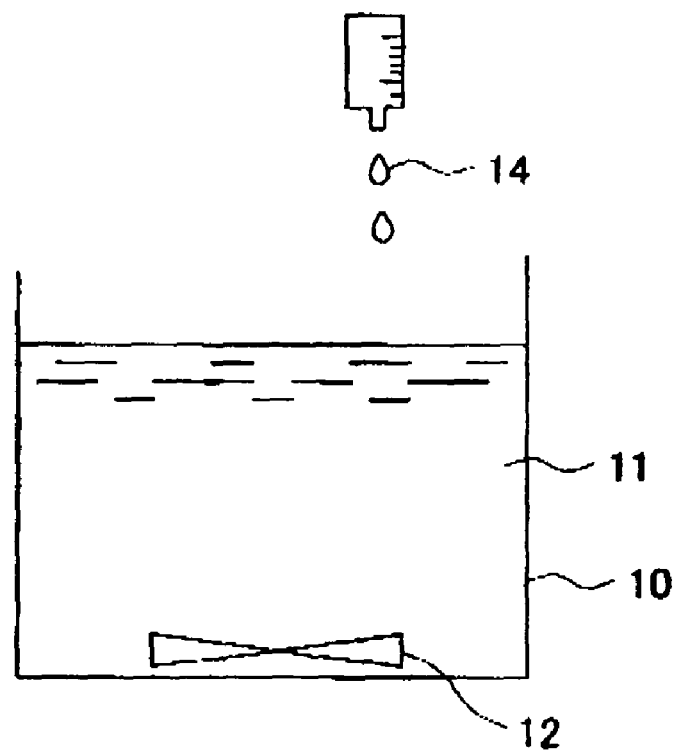

FIGS. 1A and 1B are schematic view illustrating a method for producing a precious metal colloid according to the present embodiment.

First, as shown in FIG. 1A, for example in a reaction container 10, a solution 11 dissolving a compound containing a precious metal selected from chloroauric acid or other gold compound, silver nitrate or other silver compound, chloroplatinic acid or other platinum compound, or palladium sodium chloride or other palladium compound is received, and a solution 13 dissolving a compound A expressed by the following formula (1) or (2) as a reduction agent is added to the above solution while stirring by a stirrer 12.

The precious metal containing compound such an chloroauric acid is not limited thereto and may be applied with a compound containing a precious metal ion selected from gold, silver, platinum, and palladium and dissoluble in water.

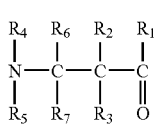

(2)

Where, $R_1$ indicates a hydrogen, a hydroxyl group, an alkoxy group, an amino group, or an atomic group bonded by a peptide bonding, each of $R_2$ and $R_3$ indicates a hydrogen, an alkyl group, or a substituted alkyl group, each of $R_4$ and $R_5$ indicates a hydrogen, an alkyl group, a substituted alkyl group, or acetyl group, and each of $R_6$ and $R_7$ indicates hydrogen, an alkyl group, or a substituted alkyl group.

As the above compound A, an α- or β-amino acid compound such as an α- or β-amino acid in which $R_1$ is hydroxyl group or an α- or β-amino acid aster in which $R_1$ is an alkoxy group, an α- or β-amino acid compound in which an amino group is acetylated, a peptide in which $R_1$ is a atomic group bonded by a peptide bonding and an N-terminal end is an α-amino acid, or other peptides can be used.

As the amino acid compound, for example, aspartame, glycylglycine (diglycine), glycylglycylglycine (triglycine), or other peptide in which the N-terminal end is α-amino acid, or other peptide can be used.

Otherwise, α-amino acid or other amino acid, or amino acid derivatives can be used, for example, alanine, asparagine, cysteine, glutamine, glycine, isoleucine, leucine, methionine, phenylalanine, proline, serine, threonine, tryptophan, tyrosine, valine, aspartic acid, glutamic acid, arginine, histidine, lysine, or esterified compound of the same can be used.

An amide compound in which $R_1$ is an amino group in the formula (1) or (2) can be used for example.

Glucosamine in which $R_1$ is a hydrogen, $R_2$ is (—CH(OH)—CH(OH)—CH(OH)—$C_2$(OH)) and each of $R_3$, $R_4$ and $R_5$ is a hydrogen in the formula (1), or N-acetylglucosamine which is a derivative of the same or other glucosamine compounds can also be used for example.

And, an amide compound in which each of $R_4$ and $R_5$ is a hydrogen, a methyl group or other alkyl groups, or a substituted alkyl group, or one of $R_4$ and $R_5$ is an acetyl group in the formula (1) or (2) can also be used.

Particularly, as the reduction agent for gold, silver and platinum, it is preferably to use a peptide and a glucosamine compound. As the reduction agent for palladium, it is preferably to use an amino acid.

The above compound such an the amino acid is independently used and a mixture thereof can be preferably used.

Then, as shown in FIG. 1B, while a water solution of the above precious metal containing compound and the compound A is for example heated in a predetermined temperature (for example 50 to 70° C.), KOH, NaOH, or other alkali (alkaline solution 14) for supporting a reductivity of the compound A is added in the water solution.

By the above step, the necessary agents are mixed and continuously stirred at a predetermined temperature, as a result, a reduction reaction of a precious metal ion in the precious metal containing compound occurs to form a precious metal nanoparticle having a particle diameter of 1 to 200 nm, which is protected by a protection component and dispersed in water to become a precious metal colloid.

The amino acid compound is originally stable in chemically and does not have a reduction property in a general environment. The present inventor discovered that the amino acid compound expressed the reduction property reducing gold or other precious metal ion under an alkaline environment and accomplished the present invention.

This is considered that an amino group and a carboxyl group contained in the amino acid compound become —COO⁻ and —$NH_3^+$ and are stabilized in a neutral state, and the carboxyl group becomes —COO⁻ while the amino group presents in —$NH_2$ state in the alkaline environment, as a result, the reduction property is enhanced.

A compound expressed by the above compound A other than the above amino acid compound in also originally stable in chemically in the same way as the amino acid compound, however expresses the reduction property reducing a precious metal ion in the alkaline environment.

Here, in the above step of adding the alkali, preferably the alkali is added so that pH of the solution may become 10 or more.

If pH thereof is too low, a reaction rate is low in a formation reaction of the gold colloid and the reaction may hardly proceed. It is preferably to add the alkali so that pH may be 11 or more for accelerating the reaction, specifically, pH is set to 11 to 12. When an α-amino acid is used as the reduction agent, it is preferable to set pH to about 12.

In this way, the alkali is added while pH is controlled, so it is preferable to add gradually the alkali by using a pipette or a burette while checking pH.

For dispersing an unreacted matter and salts from the precious metal nanoparticle (colloid) obtained in the above way, the following treatments is carried out: (1) performing an ultrafilteration used with a centrifugation (filter of 30,000 in molecule weight, at 1,500 to 3,000 rpm) and suitably adding water; (2) using an osmotic film; (3) separating by ultracentrifugation (50,000 rpm for 10 minute) and adding water.

By the above treatment, pH of the solution is neutralized and controlled so as to become 7 or more.

The solution for example is separated into a precipitate and a top clear layer by centrifugation, the top clear-layer is removed and the precipitate is extracted, diluted by water, and neutralized so that pH thereof may not be 7 or more. A concentration of the precious metal colloid is controlled by the amount of water added at that time, so a high concentration is easily possible.

A colloid flocculates without a protection, no it is general to add the protection agent and suspend the colloid in a polymer material and coagulate the same for a long term storage.

On the other hand, in the present embodiment, as later description, a compound A added as the reduction agent is oxidized, encloses the precious metal nanoparticle, and functions as the protection component. The precious metal nanoparticle (colloid) formed in this way is protected by a low molecule compound, is not deposited, disperses and presents stability as a colloid in which a long-term storage for A couple of month is possible without adding other protection component.

Note that, for hardly precipitating, methionine, cysteine, or other amino acid containing sulfur or a gelatin colloid may be added.

As an addition amount of an amino acid compound or other reduction agents for the precious metal containing compound, the addition amount of an amino acid, a peptide, or other reduction agents is preferable 1 to 10 mol per 1 mol of chloroauric acid or other precious metal containing compounds, further 3 to 5 mol is preferable. If the reduction agent is small amount, the reduction of gold may be carried out insufficiently, while large amount, excess thereof is not contributed to the reduction and wasted.

A particle diameter of the precious metal nanoparticle can be controlled by types or concentration of an amino acid, a peptide, or other reduction agents.

For example, the gold colloid obtained by dispersing the gold nanoparticle is formed by using glycine, glycylglycine (diglycine), and glycylglycylglycine (triglycine) by the method of the present embodiment, the particle diameter of the gold nanoparticle gradually decreases by changing in an order of glycine, glycylglycine (diglycine), and glycylglycylglycine (triglycine) successively.

According to the method for producing the precious metal colloid in the present embodiment, a strong toxicity agent is unnecessary, an amino acid compound, a glucosamine compound, or other reduction agents, which is easily obtained and low cost, and an alkali are only added to a solution dissolving the precious metal containing compound to form the precious metal nanoparticle by the reduction reaction of the precious metal ion in the precious metal containing compound, and the precious metal colloid enabling a long term storage and a formation of a thin film having a high conductivity can be produced in simply and in low cost.

Further, according to the method for producing the precious metal colloid in the present embodiment, depending on a water amount added after depositing a precipitate or an agent amount used for the reaction, the precious metal colloid obtained by dispersing the precious metal nanoparticle having a high concentration in 20 to 30 wt % can be produced.

The precious metal colloid according to the present embodiment, formed by the above method for producing the same, has a characteristic in that, when using a peptide as the reduction agent, the maximum peak presents in 160 to 190 ppm other than peaks of a primary carbon and an aromatic carbon in $^{13}$C-NMR (nuclear magnetic resonance) spectrum of the protection component separated from the precious metal colloid by centrifugation treatment. This indicates that the protection component is an oxide of the peptide.

The precious metal colloid has also a characteristic in that, when using glucosamine as the reduction agent, peaks present in 20 to 90 ppm and 160 to 190 ppm in $^{13}$C-NMR spectrum of the protection component separated from the precious metal colloid by centrifugation treatment. This indicates that the protection component is an oxide of glucosamine.

The precious metal colloid according to the present embodiment has a characteristic in that the particle diameter is a monodisperse and a standard deviation of the particle diameter of the precious metal nanoparticle is 15% or less, preferably the particle diameter of the monodisperse is 1 to 200 nm.

The precious metal colloid can be used in the monodisperse or by mixing various size of particles depending on an application thereof.

The precious metal colloid according to the present embodiment has a characteristic in that it returns to a colloid state when added with water after coated and dried.

A gold colloid in the related art does not return to the colloid state after drying once even if water is added, the precious metal colloid according to the present embodiment is possible.

The precious metal colloid according to the present embodiment is a precious metal colloid in which the protection component protects the precious metal nanoparticle selected from gold, silver, platinum, and palladium, and is formed by mixing the reduction agent expressed by the above compound A and an alkali for supporting the reductivity of the compound A in the solution dissolving the precious metal containing compound selected from gold, silver, platinum, and palladium, and dispersing in a water solution the precious metal nanoparticle formed by the reduction reaction of the precious metal ion in the precious metal containing compound.

Preferably, pH thereof is controlled 10 or more by the above alkali.

In a gold colloid for example, the solution becomes dark wine red color due to the plasmon absorption in 525 to 530 nm region characteristics of the gold colloid.

A concentration of the gold colloid can be obtained by measuring a photo absorption intensity in 520 to 525 nm region in the photo absorption spectrum.

The precious metal colloid according to the present embodiment is: a precious metal colloid protected by a peptide oxide in which the maximum peak of $^{13}$C-NMR spectrum presents in 160 to 190 ppm other than peaks of a primary carbon and an aromatic carbon or by an oxide of a glucosamine compound in which the peaks of the same present in 20 to 90 ppm and 160 to 190 ppm; a precious metal colloid in which the standard deviation of the particle diameter of the precious metal nanoparticle is 15% or less; or a precious metal colloid returning to a colloid state when added with water after coated and dried, in formed by adding the compound A such as a peptide or a glucosamine compound as the reduction agent, which is easily obtained and low cost, and the alkali in a solution dissolving the precious metal containing compound containing a precious metal selected from gold, silver, platinum, and palladium. Also, the precious metal colloid can be produced in simply and in low cost without strong toxicity agent, can withstand a long-term storage, and can form a thin film having a high conductivity.

The gold colloid is for example applied to a coating material for forming a gold plate for example by coating and heating, and a pregnancy test agent obtained by bonding an antibody.

Also, it is applied to a biosensing such as a genetic testing for detecting a DNA having a specified nucleotide sequence.

This is for example formed by immobilizing a DNA having a nucleotide sequence to be detected and a completely complement nucleotide sequence to a gold nanoparticle to form a colloid, in which the DNA having the nucleotide sequence to be detected is bonded, the gold nanoparticle flocculates, and a solution color thereof changes to detect the DNA having the specified nucleotide sequence.

And by applying the precious metal colloid according to the present embodiment, a conductive metal thin film can be formed in the following way.

For example, an operation in which a separation is carried out by an ultracentrifugation (at 3,000 rpm for 30 minute) and a top clear layer is removed, is performed twice, the resultant is added with a small amount of water and extracted in a container for example made of glass. Water is evaporated to obtain the precious metal plate.

An another method, 0.25 mol of thiodiglycollic acid, thidiprolic acid, or the sulfur containing compound solution is added to the precious metal colloid solution formed in 1 mmol scale, and the mixture is reacted for 10 minute while stirring in a water bath at 50° C. The resultant solution is separated by the ultracentrifuge (at 3,000 rpm for 20 minute), and the precipitate is extracted in a container for example made of glass and added with water of 20 ml to suspend the resultant. The resultant is added with ethanol of 20 to 40 ml, stirred, left, and air-dried. The precious metal plate can be obtained from a dried portion.

For forming a conductive film or a fine line, it is necessary to use a precious metal colloid solution having a high concentration. In the present embodiment, the colloid solution having a high concentration of 0.1 to 0.5 mol/l can be formed easily.

Example 1

As a compound containing gold, chroloauric acid (H[Au(III)Cl$_4$]·3.8H$_2$O) of 0.5 mmol (204 mg) was dissolved in pure water of 30 ml.

Then, as an amino acid compound, aspartame (L-aspartyl-L-phenylalanine methylester) of 1.5 mmol (442 mg) was dissolved in pure water of 20 ml, and added to the above chroloauric acid solution.

Then, a solution of the chroloauric acid and the aspartame was heated in a water bath in 70° C., and a 0.5 N KOH solution was gradually added for five minute while stirring the solution for preventing a precipitate up to pH of 11 to 12. The needed KOH solution was 8 to 9 ml.

Table 1 illustrates a result of observing pH and an appearance of a solution in adding the above KOH solution.

TABLE 1

| time | pH | appearance of solution |
|------|-----|------------------------|
| 0 min | 2.7 to 3.0 | yellow solution of chloroauric acid |
| 3 min | 6.0 | no precipitation |
| 5 min | 11.0 | change from yellow to red (KOH addition ends) |
| 15 min | 11.0 | change to deep wine red |

As described above, the deep wine red solution due to the plasmon absorption in 525 to 530 nm region of the gold colloid was obtained.

In the above reaction, the solution had red-color within 10 minute of a reaction time after controlling pH of 11 and an intensity of the absorption was in 520 nm of the photo absorption spectrum was the maximum.

The deep wine red colored solution was separated by a centrifugation (50,000 rpm, 20 min) into a precipitate (gold colloid) and a top clear layer. The top clear layer was extracted by a Pasteur. The resultant precipitate (gold colloid) was added with water to disperse the same, which had the deep wine red solution.

Example 2

A water solution of glycylglycine (diglycine) of 1.5 mmol was added to a water solution of chroloauric acid of 0.5 mmol, and the mixed solution was generally added with an alkali up to pH of 11 while heating in 70° C. to obtain the deed wine red colored solution in which the gold colloid was dispersed in the same way as example 1. The solution of the gold colloid having a higher concentration wan obtained as the amount of the agents increased.

Figure 2:
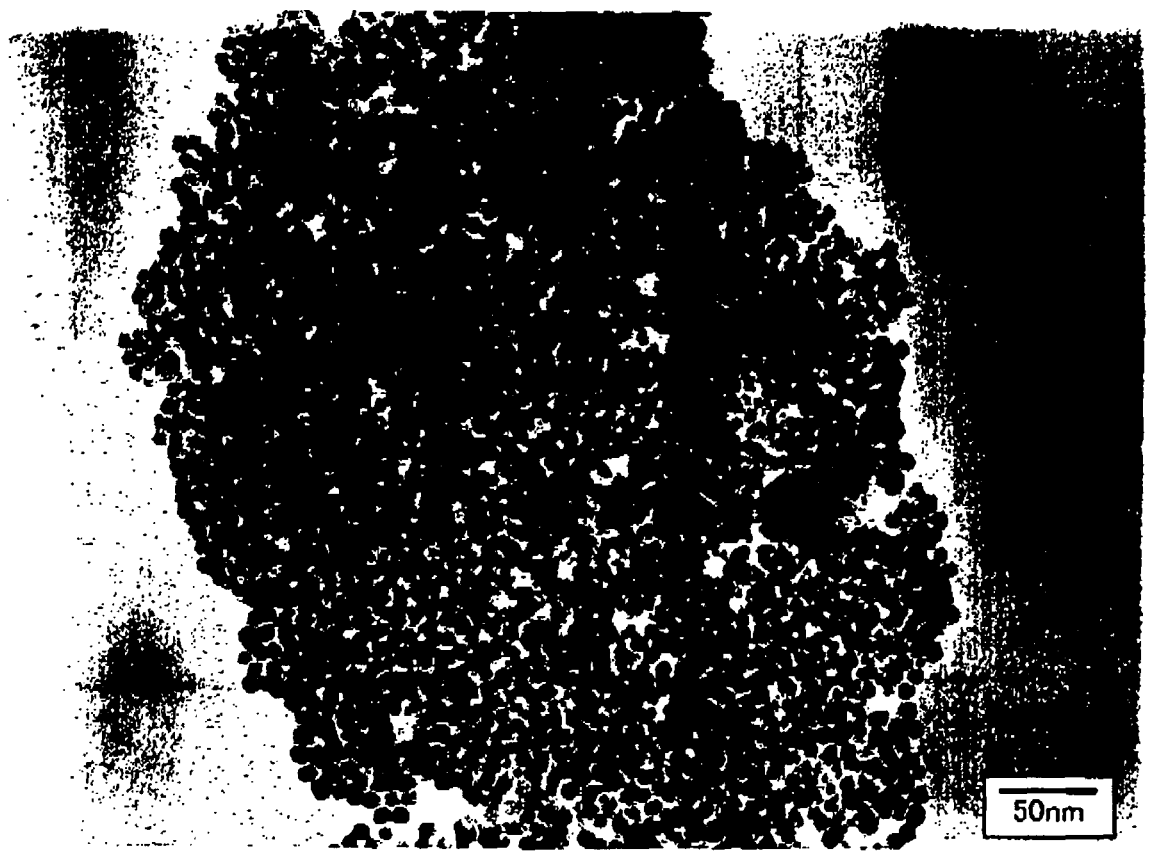
FIG. 2 is a photograph by TEM (transmission electron microscope) of a gold nanoparticle (gold colloid) produced in example 2.

FIG. 2 illustrates a photograph by TEM (transmission electron microscope) of the resultant gold colloid.

A particle diameter was 8±2 nm, which was measured from the above TEM photograph.

The gold colloid solution was extracted at a glass plate, added with a small amount of ethanol, stirred, and dried in air to form a golden film. Water was added with the resultant golden film to disperse the gold colloid and obtain the deep wine red colored solution again.

A solution dissolving L-methionine of 0.5 mmol as the sulfur containing compound of the protection agent in pure water was added to the above gold colloid solution and reacted for about an hour. The resultant solution was separated by a centrifugation into a precipitate and a top clear layer. The top clear layer was removed by a Pasteur. The resultant precipitate (gold colloid) was collected and extracted in a glass plate and dried off by a dryer machine to form a golden film. The resultant golden film was strong and did not dissolve by adding water.

The above gold colloid solution could be stored for long term by controlling pH thereof to neutral to weak alkalinity. A gelatin colloid in added to the above gold colloid solution and dried to enable a storage in a state being easy to see the wine red color characteristic of the gold colloid.

Example 3

A water solution of α-alanine of 1.5 mmol was added to a water solution of chroloauric acid of 0.5 mol, and the mixed solution was generally added with an alkali up to pH of 12 while heating in 70° C. to obtain the deep wine red colored solution in which gold colloid wan dispersed in the same way as example 1.

On the other hand, in the same way as the above method, in a condition different from the above only in that β-alanine was used as the amino acid, the gold colloid was obtained, which was the same as the above while a reaction rate was markedly slower than that of α-alanine.

Further, when β-alanyl-L-histidine of a peptide containing β-alanine was used and reacted, the same result as β-alanine was obtained.

From the above facts, it was understood that an α-amino acid is preferably as the amino acid and the N-terminal end of a peptide is also preferably the α-amino acid in the reaction for forming the gold colloid. It was also understood that a β-amino acid can be used except for a low reaction rate.

Hereinafter, a difference of characteristic between the α-amino acid and the β-amino acid described above will be considered.

When comparing for example ethylamine (CH$_3$CH$_2$NH$_2$), β-alanine (HN$_2$CH$_2$CH$_2$COOK), and α-alanine (NH$_2$ (CH$_3$) CHCOON), in an order of ethylamine>β-alanine>α-alanine, it is known that the former has a strong amine nature and the latter has a weak amine nature.

It is because that α-alanine forms a resonance formation in a molecule, while β-alanine does not form the resonance formation due to one more carbon chain between an amino group and a carboxyl group compared with α-alanine and the amino group is considered to bond an alkyl group.

With considering the above, it is considered that a resonance of the carboxyl group or the carbonyl group (aside group) bonded to the same carbon as a terminal end of the amino group causes an optimal environment for reducing gold.

In the above reaction for forming the gold colloid, when comparing tripeptide, dipeptideester, dipeptide, α-amino acid ester, and α-amino acid as the reduction agent, it was understood that the former the reaction for forming the gold colloid proceeded easily and the latter the reaction did not proceed easily in the above order. Namely, it in considered that the colloid can be formed in stable and few precipitate as the reduction agent has long chain.

Example 4

Chroloauric acid of 1 mmol was dissolved in pure water of 30 ml and triglycine of 1 mmol was added. The resultant solution was stirred for 10 minute in water bath of 60° C. and 0.5 N KOH solution was added up to alkalifying (pH of about 12) for 30 minute. In this time, a solution color changes from yellow to reddish brown. The resultant was added with 1N HCL to control pH of 7.5. The resultant gold colloid was set to an ultrafilteration used with the centrifugation (30,000 of molecular weight in filter, 1,500 to 3,000 rpm) to decrease an unreacted matter and a salt and suitably water was added.

By using the resultant colloid solution, measurement of a particle diameter distribution, XRD, SEM, TEM, UV, and electrophoresis, and an element analysis of a dried sample were carried out.

Example 5

The protection component of the precious metal colloid according to the present embodiment described above is not able to be directly measured by $^1$H-NMR or $^{13}$C-NMR.

However, a process in which the precious metal colloid was separated by centrifugation treatment into a solid component and a liquid component, and the resultant liquid component was concentrated, dried, and dissolved in $D_2O$ to apply an NMR measurement was carried out one to five times, so the protection component finally deposited on the colloid can be specified. It was verified that the precious metal nanoparticle flocculated and the particle diameter increases as the number of times of the process increased. This is shown that the liquid component obtained by the centrifugation treatment contains the protection component separated from the precious metal colloid.

Figure 3A:
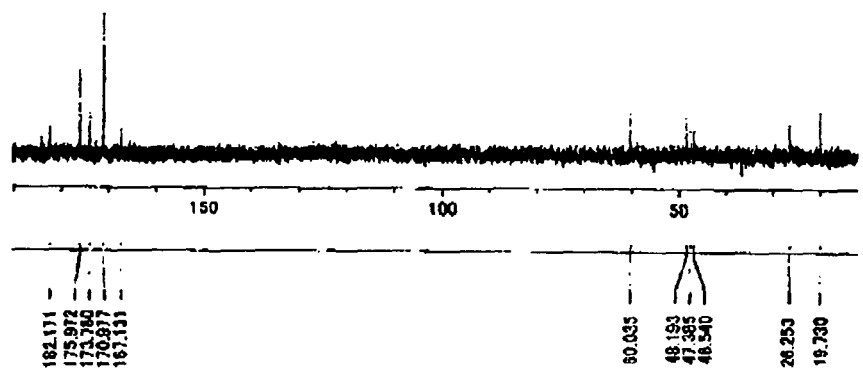
FIGS. 3A and 3B illustrate $^{13}$C-NMR spectrum measured in example 5.

FIG. 3A illustrates $^{13}$C-NMR spectrum of the protection component of the gold colloid produced by using triglycine of a peptide as the reduction agent in example 4.

When using a peptide as the reduction agent, in $^{13}$C-NMR spectrum of the protection component, the maximum peak presents in 160 to 190 ppm other than peaks of a primary carbon and an aromatic carbon, so it was verified that an oxide of the peptide functioned as the protection component. A peak of the peptide was not detected.

Figure 3B:
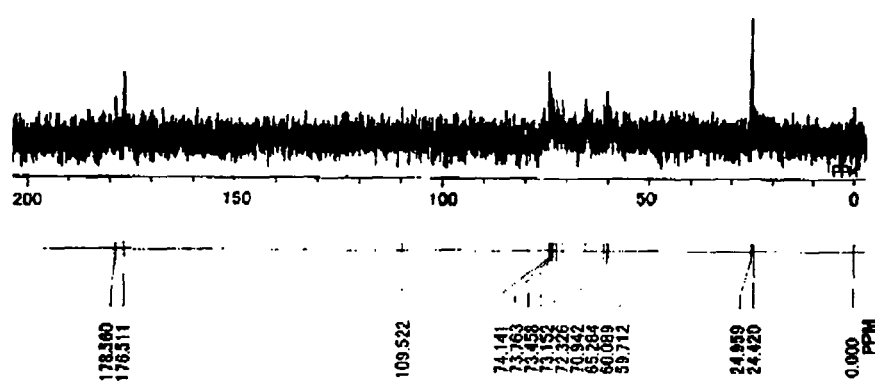

FIG. 3B illustrates $^{13}$C-NMR spectrum of the protection component of the gold colloid produced by using glucosamine an the reduction agent in the sane way as example 4.

When using glucosamine as the reduction agent, in $^{13}$C-NMR spectrum of the protection component, peaks presents in 20 to 90 ppm and 160 to 190 ppm, so it was verified that an oxide of the glucosamine functioned an the protection component. A peak of the glucosamine was not detected.

On the other hand, in the case of the gold colloid formed by a reduction by citric acid or the gold colloid formed by a reduction by citric acid and tannic acid according to the related art, a presence of the citric acid was usually detected when the above treatment and NMR measurement was carried out, so it was verified that a situation thereof differed from the case of the peptide and glucosamine.

Second Embodiment

In the present embodiment, a precious metal colloid will be described, in which a protection component protects a precious metal nanoparticle selected from gold, silver, platinum, and palladium and having a particle diameter of 1 to 200 nm, which is for example a water-based precious metal colloid dispersed in water, or an organic solvent based precious metal colloid dispersed in an organic solvent.

Figure 4A:
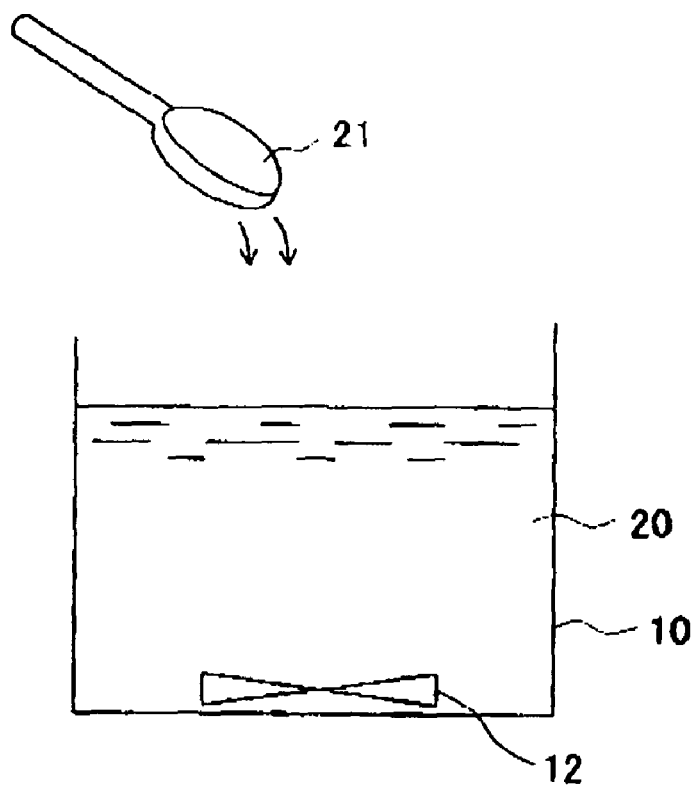
FIGS. 4A and 4B are schematic views illustrating a method for producing a precious metal fine-particle according to the second embodiment.
Figure 4B:
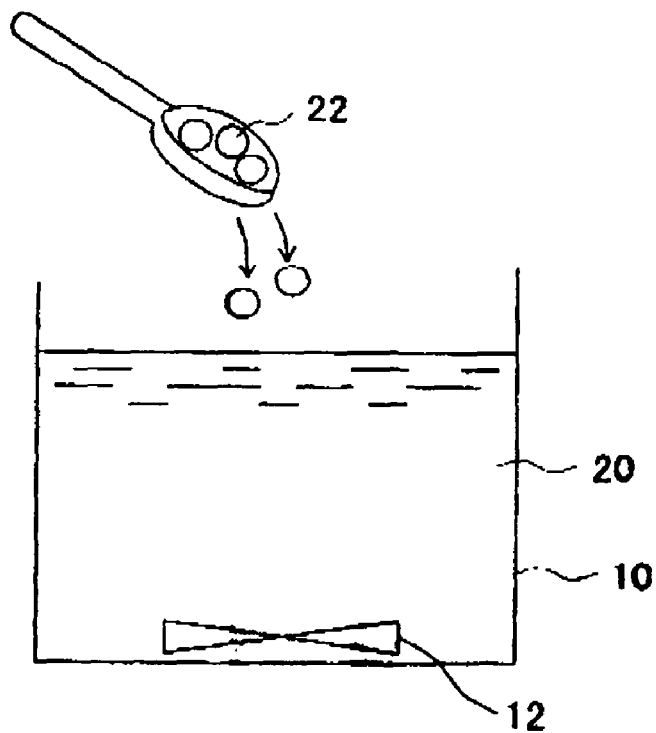

FIGS. 4A and 4B are schematic view illustrating a method for producing a precious metal nanoparticle according to the present embodiment.

As shown in FIG. 4A, in a reaction container 10, a solution 20 dissolving in ethanol or other organic solvent a precious metal containing compound containing a precious metal selected from chloroauric acid or other gold compound, silver nitrate or other silver compound, chloroplatinic acid or other platinum compound, or sodium palladium chloride or other palladium compound is received, and a compound A expressed by the following formula (1) or (2) as a reduction agent is added in the solution 20 while stirring by a stirrer 12.

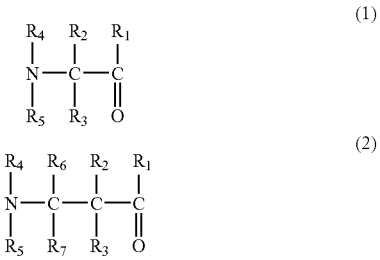

Where, $R_1$ indicates a hydrogen, a hydroxyl group, a methoxy group or other alkoxy group, an amino group, or a bonding group bonded by a peptide bonding, each of $R_2$ and $R_3$ indicates a hydrogen, a methyl group or other alkyl group, or a substituted alkyl group, each of $R_4$ and $R_5$ indicates a hydrogen, a methyl group or other alkyl group, a substituted alkyl group, or an acetyl group, and each of $R_6$ and $R_7$ indicates a hydrogen, a methyl group or other alkyl group, or a substituted alkyl group.

As the above compound A, an α- or β-amino acid compound such as an α- or β-amino acid in which $R_1$ is a hydroxyl group and an α- or β-amino acid ester in which $R_1$ is an alkoxy group, an α- or β-amino acid compound in which an amino group is acetylated, a peptide in which $R_1$ is a atomic group bonded by a peptide bonding and an N-terminal end in an α-amino acid or other peptide in the formula (1) or (2), and the amino acid compound described in the first embodiment can be used preferably.

And, an amide compound in which $R_1$ is an amino group in the formula (1) or (2) can be used for example.

And, glucosamine in which $R_1$ is a hydrogen, $R_2$ in (—CH(OH)—CH(OS)—CH(OH)—CH$_2$(OH)) and each of $R_3$, $R_4$ and $R_5$ is a hydrogen in the formula (1), N-acetylglucosamine which is a derivative of the same or other glucosamine compounds can also be used for example.

And, an amide compound in which each of $R_4$ and $R_5$ is a hydrogen, a methyl group or other alkyl group, or a substituted alkyl group, or one of $R_4$ and $R_5$ is an acetyl group in the formula (1) or (2) can also be used.

Particularly, as the reduction agent for gold, silver and platinum, the peptide or the glucosamine compound is preferably used. Particularly, as the reduction agent for palladium, an amino acid is preferably used.

The amino acid or other compound described above is independently used and a mixture thereof can be preferably used.

As an addition amount of the compound A for the precious metal containing compound, the compound A is preferably 1 to 10 mol, more preferably 3 to 5 mol, per 1 mol of the precious metal containing compound.

The precious metal containing compound containing the precious metal selected from gold, silver, platinum, and palladium may be a compound containing a precious metal ion selected from gold, silver, platinum, and palladium and dissolving in a solution, such as $HAuCl_4$ or other gold containing compound, $AgNO_3$ or other silver containing compound, $K_2PtCl_1$, $H_2PtCl_6$ or other platinum containing compound, or $Na_2PdCl_4$, $NaKPdCl_4$ or other palladium containing compound.

Then, as shown in FIG. 4B, while a solution mixed with the precious metal containing compound and the compound A is for example heated in a predetermined temperature (for example 50 to 70° C.), KOH, NaOH, or other granular alkali 22 for supporting a reductivity of the compound A, or $CH_3OK$ or other alkali is added in the solution. Due to using the solution of the organic solvent, the alkali 22 is preferably added in solid granular or in a high concentration solution state, not in a solution state. Although the solid powdered alkali can be also used, the granular alkali is preferably due to the progress of the reaction easily.

By the above step, the necessary agents are mixed and the resultant solution (suspension) is continuously stirred at a predetermined temperature, as a result, a reduction reaction of a precious metal ion in the precious metal containing compound occurs to form a precious metal fine-particle (hereinafter, referred to a precious metal nanoparticle) having a particle diameter of for example 1 to 200 nm.

In the above case, the particle diameter of the precious metal nanoparticle to be formed can be controlled depending on a type and concentration of the reduction agent such as an amino acid and a peptide. In this case, the reaction can be accelerated when the suspension is aired.

The amino acid compound used as the compound A indicates the reductivity in the solution of the organic solvent due to the addition of the alkali, and can reduce the precious metal ion to form the precious metal nanoparticle.

A compound having an aldehyde group such as glucosamine can form the precious metal nanoparticle by adding an alkali in the solution of the organic solvent, while the compound does not independently form the precious metal nanoparticle by reducing the precious metal ion.

Then, the solution containing the precious metal nanoparticle formed as described above in placed and separated into the precipitate and the top clear layer. The top clear layer is removed by a decantation and the precipitate in extracted.

The small amount of water for example is added to the resultant precipitate to form a water based precious metal colloid obtained by dispersing the precious metal nanoparticle in water.

Then, by controlling the amount of water to be added in the above described step, further by concentrating by ultrafilteration or a dialysis used with a dialysis film, removing malts and an unreacted matter, adding a water-ethanol mixed solution to deposit the colloid, filtering the same again to obtain the precipitate, and adding water to the precipitate, the water based precious metal colloid having a high concentration of for example 20 to 30 wt % can be formed.

The resultant water based precious metal colloid can be controlled to pH thereof of about 7.5 by 1N HCl for example.

In the suspension mixed with the precious metal containing compound, the compound A, and an alkali, dodecanethiol or other sulfur compound is added in advance as an organic solvent protection agent, so the precious metal nanoparticle in formed with a protection by the organic solvent protection component, therefore, the precipitate is extracted by the decantation as described above and then the small amount of chloroform, toluene or other organic solvent is added to form an organic solvent based precious metal colloid having a high concentration obtained by dispersing the precious metal nanoparticle in the organic solvent. The additional amount of the organic solvent protection agent in for example "the precious metal containing compound: the organic solvent protection agent=1 (mol):0.5 to 1 (mol)".

A reaction for forming the precious metal nanoparticle by the reduction reaction an described above becomes longer in an order of gold, palladium and platinum. For example, a formation of a gold nanoparticle to finished in about one to several hours for example, while a formation of a platinum nanoparticle is finished in about one to several days.

According to a method for producing the precious metal colloid in the present embodiment, a strong toxicity agent is unnecessary, an amino acid compound or other compound, which is easily obtained and low cost, is added as the reduction agent and an alkali for supporting the reductivity of the reduction agent is added in a solution dissolving the precious metal containing compound to form the precious metal nanoparticle, thereby the precious metal colloid enabling a long-term storage and a formation of a thin film having a high conductivity can be produced in simply and in low cost.

The precious metal colloid according to the present embodiment, formed by the above method for producing the same, has a characteristic in that, when using a peptide as the reduction agent, the maximum peak presents in 160 to 190 ppm other than peaks of a primary carbon and an aromatic carbon in $^{13}C$-NMR (nuclear magnetic resonance) spectrum of the protection component separated from the precious metal colloid by centrifugation treatment. This indicates that the protection component is an oxide of the peptide.

The precious metal colloid has also a characteristic in that, when using glucosamine as the reduction agent, peaks of $^{13}C$-MM spectrum present in 20 to 90 ppm and 160 to 190 ppm. This indicates that the protection component is an oxide of the glucosamine.

The precious metal colloid according to the present embodiment has a characteristic in that the particle diameter thereof is the monodisperse and the standard deviation of the particle diameter of the precious metal nanoparticle is 15% or less. Preferably, the particle diameter of the monodisperse is 1 to 200 nm.

The precious metal colloid according to the present embodiment has a characteristic in that it returns to a colloid state when added with water after coated and dried.

The precious metal colloid according to the present embodiment is a precious metal colloid in which the protection component protects the precious metal nanoparticle selected from gold, silver, platinum, and palladium, and is formed by mixing the reduction agent expressed by the above compound and an alkali for supporting the reductivity of the compound A in the solution dissolving the precious metal containing compound selected from gold, silver, platinum, and palladium, and by dispersing in a solution the precious metal nanoparticle formed by the reduction reaction of the precious metal ion in the precious metal containing compound.

Preferably, the above solution is a water solution and pH thereof is controlled to 10 or more by mixing an alkali. More preferably, pH of the solution in controlled to 7 or more after the precious metal nanoparticle is formed.

Preferably, the above solution is an alcohol solution.

The precious metal colloid according to the present embodiment in observed with a very small particle having the particle diameter of about 1 to 200 nm by a TEM (transmission electron microscope) photograph, and obtained with a peak of X-ray diffraction indicating a metal solid by a measurement of an X-ray diffraction examination spectrum, which are results indicating that the precious metal nanoparticle is formed.

The precious metal colloid according to the present embodiment is: a precious metal colloid protected by a peptide oxide in which the maximum peak of $^{13}$C-NMR spectrum presents in 160 to 190 ppm other than peaks of a primary carbon and an aromatic carbon or an oxide of the glucosamine compound in which peaks of the $^{13}$C-NMR present in 20 to 90 ppm and 160 to 190 ppm; a precious metal colloid in which the standard deviation of the particle diameter of the precious metal nanoparticle is 15% or leas; or a precious metal colloid returning to a colloid state when added with water after coated and dried, and is formed by adding the compound A such as the peptide or the glucosamine compound, which is easily obtained and low cost, as the reduction agent and an alkali in a solution dissolving the precious metal containing compound containing a precious metal selected from gold, silver, platinum, and palladium. Also, the precious metal colloid can be produced in simply and in low cost without a strong toxicity agent, can withstand a long term storage, and can form a thin film having a high conductivity.

The precious metal colloid according to the present embodiment has a specified color due to the plasmon absorption characteristic of the respective colloid elements.

An application of the gold colloid is for example mentioned as a gold plate coating material, a pregnancy test agent obtained by bonding an antibody, and a genetic testing or other biosensing for example.

The water based precious metal colloid or the organic solvent based precious metal colloid described above is coated on a glass plate and dried (evaporated water or organic solvent) to form a thin film having a good conductivity.

Example 6

Chroloauric acid of 0.5 mmol as the compound containing gold was dissolved into ethanol of 30 ml.

Then, triglycine of 0.5 mmol as the reduction agent was added to the above chroloauric acid solution.

Then, the ethanol solution of chroloauric acid and triglycine (suspension) was stirred and heated in 50° C. in & water bath, and a solid granular KOH of 0.2 g was added. At that time, the reaction can be accelerated when the suspension is aired.

As a result, a black precipitate was generated from the ethanol solution (suspension) and a top clear layer was colorless. The solution was placed to deposit the precipitate, and the top clear layer was removed by decantation.

The small amount of water was added to the resultant participate to form a colloid, and the resultant was concentrated by ultrafilteration to obtain a water based gold colloid having a high concentration and formed by dispersing a gold nanoparticle in water. While salts and an unreacted matter were removed by dialysis, a water-ethanol mixture solution was added to deposit the colloid, a filtration was carried out again to obtain a precipitate, and water was added to the now resultant precipitate to obtain the water based gold colloid having a high concentration. Yield was almost 100%.

Figure 5:
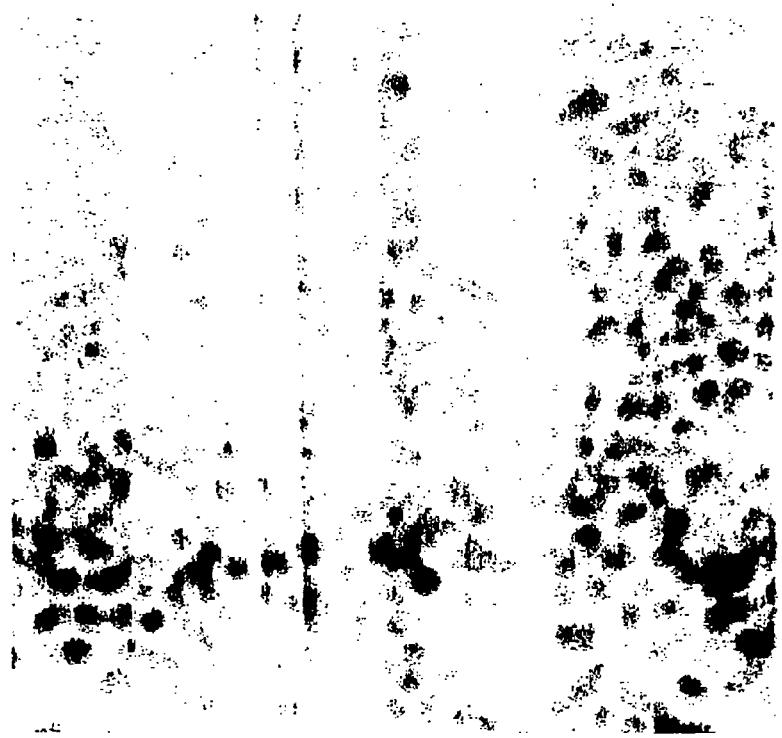
FIG. 5 is a photograph by TEM of a gold nanoparticle (gold colloid) produced in example 6.

FIG. 5 illustrates a TEM photograph of the resultant gold colloid (gold nanoparticle).

A particle diameter was 3 to 6 nm by measuring from the above TEM photograph.

Figure 6:
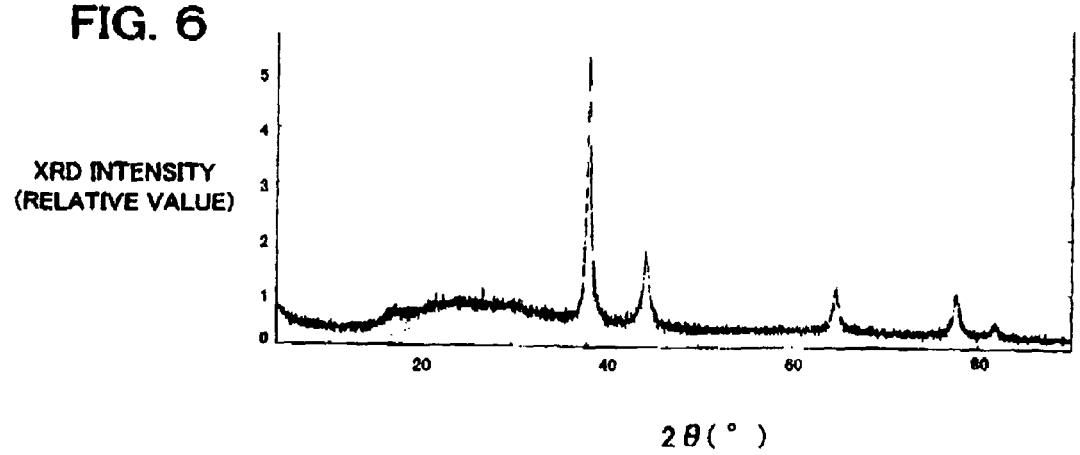
FIG. 6 illustrates an XRD spectrum of the gold nanoparticle (gold colloid) produced in example 6.

FIG. 6 illustrates XRD (X-ray diffraction) spectrum of the resultant gold colloid (gold nanoparticle), in which an abscissa indicates 2θ and an ordinate indicates an XRD intensity.

A peak indicating a metal solid was obtained from the above XRD spectrum, and it was verified that the gold nanoparticle was obtained.

Example 7

Chroloauric acid of 0.5 mmol as the compound containing gold was dissolved into ethanol of 30 ml.

Then, dodecanethiol of 0.5 mol as the organic solvent protection agent was added to the above solution, and heated and stirred.

Then, triglycine of 0.5 mmol as the reduction agent was added to the above chroloauric acid solution.

Then, an ethanol solution (suspension) of chroloauric acid, dodecanethiol, and triglycine was stirred and heated in 50° C. in a water bath, and a solid granular KOH of 0.2 g was added. At that time, the reaction can be accelerated when the suspension is aired.

As a result, a black precipitate was generated from the ethanol solution (suspension) and a top clear layer was colorless. The solution was placed to deposit the precipitate, and the top clear layer was removed by decantation.

The small amount of water was added to the resultant precipitate to dissolve sails and an unreacted matter, the resultant was placed, then a top clear layer was removed. Chloroform or toluene was added to the resultant participate to obtain an organic solvent based gold colloid having a high concentration. In the prevent example, the organic solvent protection agent was added, so a colloid was not obtained even if water was added.

In a TEM photograph and XRD (X-ray diffraction) spectrum of the resultant gold colloid (gold nanoparticle), the same result as example 6 was obtained and it was verified that the gold nanoparticle was obtained.

Example 8

Silver nitrate $AgNO_3$ of 0.5 mmol as a compound containing silver was dissolved into ethanol of 30 ml.

Then, triglycine of 0.5 mmol as the reduction agent was added to the above silver nitrate solution.

Then, an ethanol solution of silver nitrate and triglycine (suspension) was stirred and heated in 50° C. in a water bath, and a solid granular KOH of 0.2 g was added.

As a result, a precipitate was generated from the ethanol solution (suspension) and the top clear layer was colorless. The solution was placed on to deposit the precipitate, and the top clear layer was removed.

The small amount of water was added to the resultant participation to form a colloid, and the resultant was concentrated by ultrafilteration to obtain a water based silver colloid having a high concentration and obtained by dispersing a silver nanoparticle in water. Yield was almost 100%.

Figure 7:
FIG. 7 is a photograph by TEM of a silver nanoparticle (silver colloid) produced in example 8.

FIG. 7 illustrates a TEM photograph of the resultant silver colloid (silver nanoparticle).

A particle diameter was 3 to 6 nm by measuring from the above TEM photograph.

Figure 8:
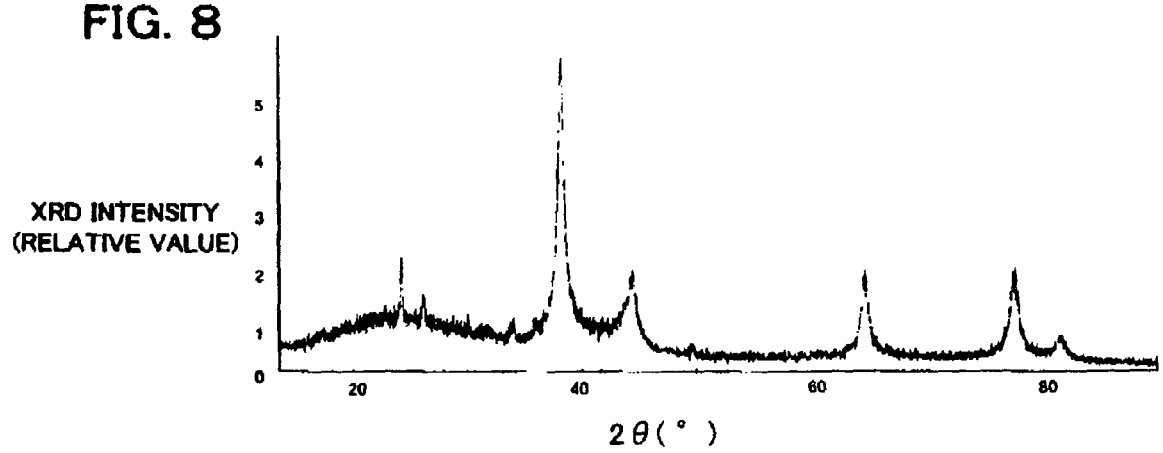
FIG. 8 illustrates an XRD spectrum of the silver nanoparticle (silver colloid) produced in example 8.

FIG. 8 illustrates an XRD (X-ray diffraction) spectrum of the resultant silver colloid (silver nanoparticle), in which an abscissa indicates 2θ and an ordinate indicates an XRD intensity.

A peak indicating a metal solid was obtained from the above XRD spectrum, and it was verified that the silver nanoparticle was obtained.

$K_2PtCl_4$ of 0.5 mmol (or $PtCl_2$ of 0.5 mmol and kalium chloride) an a compound containing platinum was dissolved into ethanol of 30 ml.

Then, triglycine of 0.5 mol as the reduction agent was added to the solution of the above platinum compound.

Then, an ethanol solution (suspension) of $K_2PtCl_4$ and triglycine was stirred and heated in 50° C. in a water bath, and a solid granular KOH of 0.2 g was added.

As a result, a precipitate was generated from the ethanol solution (suspension) and the top clear layer was colorless. The solution was placed to deposit the precipitate, and the top clear layer was removed by decantation.

The small amount of water was added to the resultant participate to form a colloid, and the resultant was concentrated by ultrafilteration to obtain a water based platinum colloid having a high concentration and formed by dispersing a platinum nanoparticle in water. Yield wag almost 100%.

Figure 9:
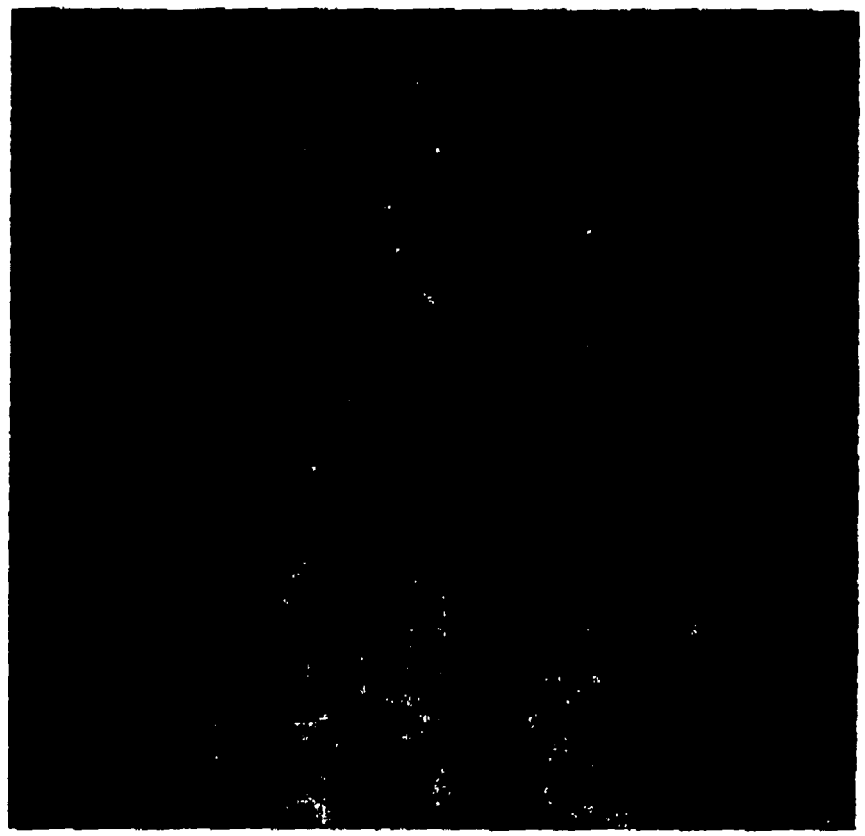
FIG. 9 is a photograph by TEM of a platinum nanoparticle (platinum colloid) produced in example 9.

FIG. 9 illustrates a TEM photograph of the resultant platinum colloid (platinum nanoparticle).

A particle diameter was 3 to 6 nm by measuring from the above TEM photograph.

Figure 10:
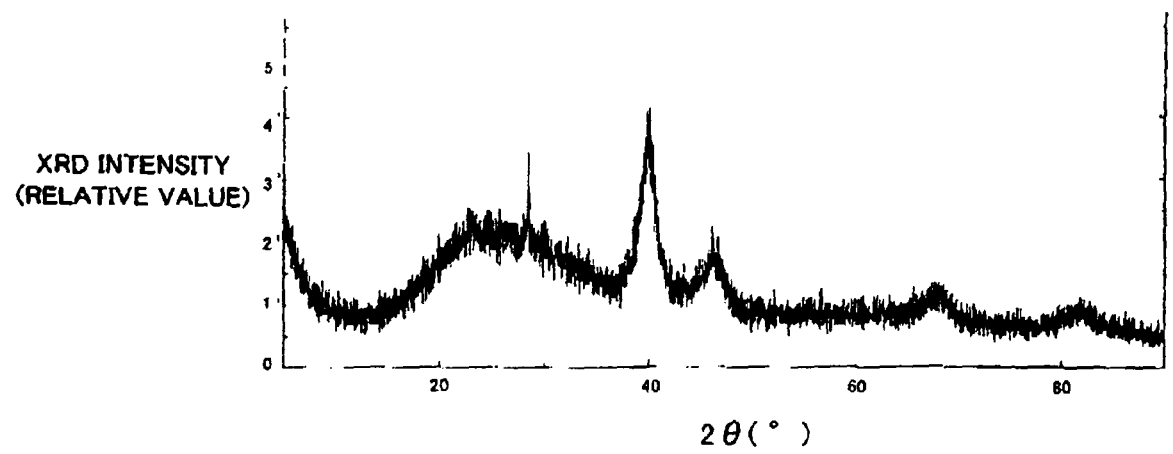
FIG. 10 illustrates an XRD spectrum of the platinum nanoparticle (silver colloid) produced in example 9.

FIG. 10 illustrates an XRD (X-ray diffraction) spectrum of the resultant platinum colloid (platinum nanoparticle), in which an abscissa indicates 2θ and an ordinate indicates an XRD intensity.

A peak indicating a metal solid was obtained from the above XRD spectrum, and it was verified that the platinum nanoparticle was obtained.

Example 10

$Na_2PdCl_4$ of 0.5 mmol as a compound containing palladium was dissolved into ethanol of 30 ml.

Then, triglycine of 0.5 mmol as the reduction agent was added into the solution of the palladium compound.

Then, an ethanol solution (suspension) of $Na_2PdCl_4$ and triglycine was stirred and heated in 50° C. in a water bath, and a solid granular KOH of 0.2 g was added.

As a result, a precipitate was generated from the ethanol solution (suspension) and the top clear layer was colorless. The solution was placed to deposit the precipitate, and the top clear layer was removed.

The small amount of water was added to the resultant participation to form a colloid, and the resultant was concentrated by ultrafilteration to obtain a water based palladium colloid having a high concentration and formed by dispersing a palladium nanoparticle in water. Yield was almost 100%.

Figure 11:
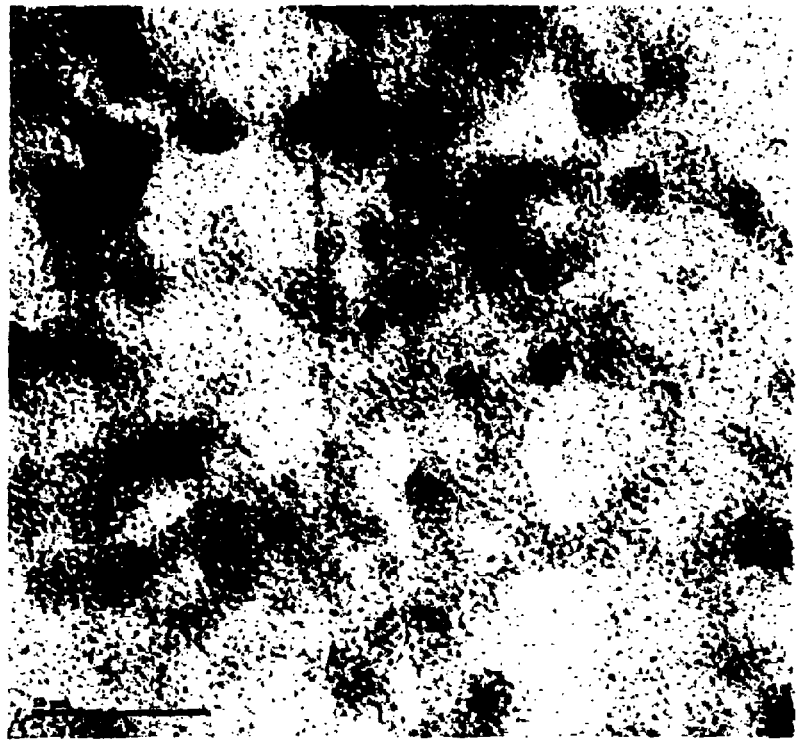
FIG. 11 is a photograph by TEM of a palladium nanoparticle (palladium colloid) produced in example 10.

FIG. 11 illustrates a TEM photograph of the resultant palladium colloid (palladium nanoparticle).

A particle diameter was 3 to 6 nm by measuring from the above TEM photograph.

Figure 12:
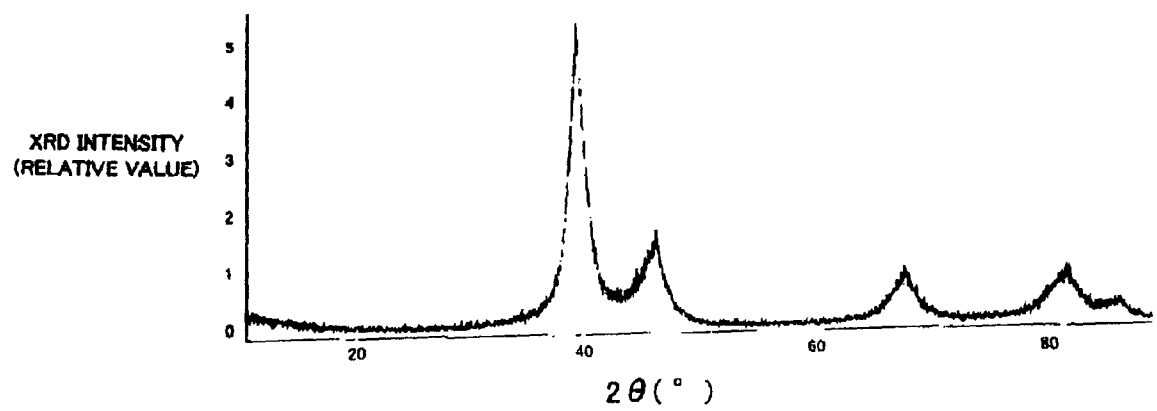
FIG. 12 illustrates an XRD spectrum of the palladium nanoparticle (palladium colloid) produced in the example 10.

FIG. 12 illustrates an XRD (X-ray diffusion) spectrum of the resultant palladium colloid (palladium nanoparticle), in which an abscissa indicates 2θ and an ordinate indicates an XRD intensity.

A peak indicating a metal solid was obtained from the above XRD spectrum, and it was verified that the palladium nanoparticle was obtained.

Example 11

Chroloauric acid of 1 mmol was dissolved into ethanol of 50 ml, triglycine of 1 mmol was added, and the above solution was heated in 60° C. Then, four solid granular NOH (400 mg) was added and placed for 30 minute to generate a black precipitate. A top clear layer was removed by decantation, and water of 10 ml was added to the precipitate. An unreacted matter and salts were decreased from the resultant gold colloid solution, which wag controlled to pH of 7.5 by 1N HCl.

By using the resultant colloid solution, the particle diameter distribution, XRD, SEM, TEM, UV, electrophoresis or other measurement and element analysis of a dried sample were carried out.

Example 12

Silver nitrate of 1 mmol was dissolved into ethanol of 50 ml, and triglycine of 1 mmol was added. Then, four solid granular KOH (400 mg) was added and placed for 30 minute to generate a brown precipitate. A top clear layer was removed by decantation, and water of 10 ml was added to the precipitate. An unreacted matter and salts were decreased from the resultant silver colloid solution, which was controlled to pH of 7.5 by 1N HCl.

By using the resultant colloid solution, the particle diameter distribution, XRD, SEM, TEM, UV, electrophoresis or other measurement, and element analysis of a dried sample were carried out.

Example 13

Sodium palladium chloride of 1 mmol was dissolved into ethanol of 50 ml, and triglycine of 1 mol was added. Then, four solid granular KOH (400 mg) was added and placed for 30 minute to generate a black precipitate. A top clear layer was removed by decantation, and water of 10 ml was added to the precipitate. An unreacted matter and salts were decreased from the resultant palladium colloid solution, which was controlled to pH of 7.5 by 1N HCl.

By using the resultant colloid solution, the particle diameter distribution, XRD, SEM, TEM, UV, electrophoresis or other measurement and element analysis of a dried sample were carried out.

Example 14

Kalium chloroplatinic acid of 1 mmol was dissolved into ethanol of 50 ml, and D-glucosamine or N-acetyl-D-glucosamine of 1 mmol was added. Then, four solid granular KOH (400 mg) was added and placed for 30 minute to generate a black precipitate. A top clear layer was removed by decantation, and water of 10 ml was added to the precipitate. An unreacted matter and salts were decreased from the resultant platinum colloid solution, which was controlled to pH of 7.5 by 1N HCl.

By using the resultant colloid solution, the particle dieter distribution, XRD, SEM, TEM, UV, electrophoresis or other measurement and element analysis of a dried sample were carried out.

Example 15

The electrophoresis (tris buffer solution in 7.2 of pH) was measured in a gold colloid (sample 1) formed by adding triglycine and an alkali to chroloauric acid.

As comparative examples, a gold colloid (sample 2) formed by adding citric aid and triglycine to chroloauric acid, a gold colloid (sample 3) formed by adding citric acid and tannic acid to chroloauric acid, a gold colloid (sample 4) formed by adding citric acid and glucosamine to chroloauric acid were also measured.

Figure 13A:
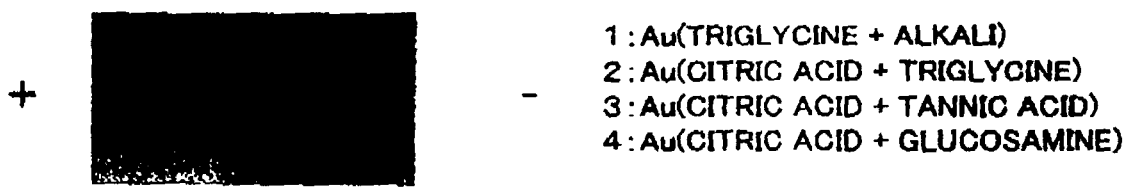
FIGS. 13A and 13B are views illustrating a result of an electrophoresis measured in an example 15.

Results is illustrated in FIG. 13A.

The gold colloid (sample 1) formed by adding triglycine and the alkali to chroloauric acid according to the present embodiment shifted to a positive side in a narrow band width, while a part of the gold colloid of sample 2 shifted to the positive side slightly and other comparative examples (samples 3 and 4) hardly shifted.

Therefore, it was understood that the gold colloid formed by the method for producing the same according to the present invention differed from comparative examples and was a negative colloid.

The electrophoresis (trio buffer solution in 7.2 of pH) were also measured in a gold colloid (samples 1 and 2) formed by adding triglycine and an alkali to chroloauric acid in example 11, a palladium colloid (sample 3) formed by adding triglycine and an alkali to sodium palladium chloride in example 13, a silver colloid (sample 4) formed by adding glucosamine instead of triglycine and an alkali to silver nitrate in example 12, a platinum colloid (samples 5 and 7) formed by adding triglycine instead of D-glucosamine and an alkali to kalium chroloplatinic acid, and a gold colloid (sample 6) formed by adding citrate acid to chroloauric acid as a comparative example.

Figure 13B:
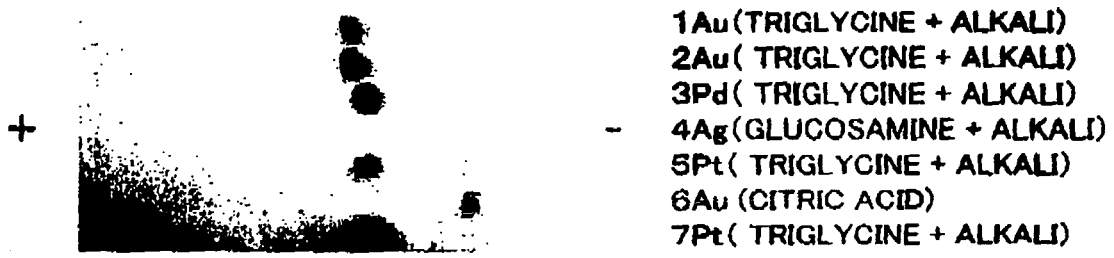

Results is illustrated in FIG. 13B.

While the silver colloid of sample 4 formed by using glucosamine did not shift, other colloids including platinum and palladium shifted to the positive side equally to the gold colloid, so it was understood that the colloids were the strong negative colloid.

Example 16

Table 2 illustrates a result testing a colloid formation, a colloid concentration, long-term storability, metal gloss of a thin film obtained by coating to a glass plate and drying, and an electrophoresis in the gold colloid (sample 1) formed by adding triglycine (peptide) and an alkali to chroloauric acid in example 11, a gold colloid (sample 2) formed by adding glucosamine instead of triglycine and an alkali, and, as comparative examples, a sample (sample 3) formed by adding only peptide, a sample (sample 4) formed by adding only glucosamine, a gold colloid (sample 5) formed by adding citric acid, a gold colloid (sample 6) formed by adding citric acid and tannic acid, a gold colloid (sample 7) formed by adding citric acid, tannic acid, and alkali, a gold colloid (ample B) formed by adding citric acid and alkali, a gold colloid (sample 9) formed by adding citric acid and peptide, a gold colloid (sample 10) formed by adding citric acid and glucosamine.

While each of samples 3 and 4 did not form the gold colloid (poor), other samples could form the same (good), specifically, samples 1 and 2 according to the present invention could form easily the same (very good).

Each of samples 1 and 2 could form the colloid in a high concentration easily (good), while other samples (samples 5 to 10) were difficult to form high concentration colloids (poor).

Each of samples 1 and 2 did not generate a precipitate after a long-ter storage for three months, while other samples (samples 5 to 10) gradually generated the same for three months (poor).

When forming the thin film, each of samples 1 and 2 could obtain a good gloss (good), while other samples (samples 5 to 10) could not obtain the same less than sample 1 and 2 (poor).

In the electrophoresis, each of samples 1 and 2 shifted to a positive side in a narrow band, while other samples (samples 5 to 10) slightly expanded or partly shifted and center portions remained.

The present invention is not limited to the above description.

For example, the compound expressed by the formula (1) or (2) as described above may be used as the reduction agent, and an α-amino acid compound, a β-amino acid compound, a peptide or a glucosamine compound of the wane, or other compound can be used.

When producing the gold nanoparticle, a compound containing a gold ion and dissolving water way be used as the gold containing compound other than chloroauric acid. When producing a nanoparticle of silver, platinum, or palladium, a compound containing the above precious metal and dissolving a solution may be used.

Other than the above, a variety of modification may be made within the scope of the present invention.

The precious metal colloid according to the present invention is a precious metal colloid protected by a peptide oxide in which the maximum peak of $^{13}$C-NMR spectrum presents in 160 to 190 ppm other than peaks of a primary carbon and an aromatic carbon and an oxide of a glucosamine compound in which the peaks present in 20 to 90 ppm and 160 to 190 ppm, a precious metal colloid in which a standard deviation of a

TABLE 2

| No. | sample | colloid | concentration | long term storage | metal gloss | electrophoresis | note |
|---|---|---|---|---|---|---|---|
| 1 | peptide + alkali | very good | good | good | good | shift in narrow band | present invention |
| 2 | glucosamine + alkali | very good | good | good | good | shift in narrow band | present invention |
| 3 | peptide | poor | poor | poor | poor | — | comp. example |
| 4 | glucosamine | poor | poor | poor | poor | — | comp. example |
| 5 | citric acid | good | average | average | average | slightly spread | comp. example |
| 6 | citric acid + tannic acid | good | average | average | average | slightly spread | comp. example |
| 7 | citric acid + tannic acid + alkali | good | average | average | average | partly shift and center remain | comp. example |
| 8 | citric acid + alkali | good | average | average | average | slightly spread | comp. example |
| 9 | citric acid + peptide | good | average | average | average | slightly spread | comp. example |
| 10 | citric acid + glucosamine | good | average | average | average | slightly spread | comp. example | particle diameter of the precious metal fine-particle is 15% or less, or a precious metal colloid returning to a colloid state when added with water after coated and dried, and can be ford by adding an alkali and a compound A, such as peptide or a glucosamine compound which is obtained easily and low cost, as the reduction agent in a solution dissolving the precious metal containing compound containing a precious metal selected from gold, silver, platinum, and palladium. Also, the precious metal colloid can be produced in simply and in low cost without strong toxicity agent, can withstand a long-term storage, and can form a thin film having a high conductivity.

The method for producing the precious metal fine-particle according to the present invention con be produced with the precious metal fine-particle enabling a long-term storage and a formation of a thin film having a high conductivity in simply and in low cost without a strong toxicity agent, by only adding the compound A such as a peptide and a glucosamine compound of a raw material, which is easily obtained and low cost, and an alkali in a solution dissolving a precious metal containing compound containing a precious metal selected from gold, silver, platinum, and palladium.

INDUSTRIAL APPLICABILITY

The precious metal colloid in the present invention can be applied to a coating material enabling a formation of a gold plate or other precious metal plate, additionally for example a pregnancy test agent obtained by bonding an antibody, and biosensing such as a genetic testing for detecting a DNA having a specified nucleotide sequence, further applied as a precious metal colloid having a specified function including a specified electric property, magnetic property, and catalytic property.

The precious metal fine-particle in the present invention can be applied to a precious metal fine-particle forming the precious metal colloid as described above.

The composition in the present invention can be applied to the precious metal colloid as described above.

And, the method for producing the precious metal fine-particle can be applied to a coating material enabling a formation of a gold plate or other precious metal plate, additionally for example a pregnancy test agent obtained by bonding an antibody, and biosensing such as a genetic testing for detecting a DNA having a specified nucleotide sequence, further applied an a precious metal fine-particle having a specified function including a specified electric property, magnetic property, and catalytic property.

LIST OF REFERENCES

10 . . . reaction container
11 . . . solution dissolving precious metal containing compound
12 . . . stirrer
13 . . . solution dissolving compound A
14 . . . alkaline solution
20 . . . alcohol solution dissolving precious metal containing compound
21 . . . compound A
22 . . . alkali

The invention claimed is:
1. A precious metal colloid comprising:
a protection component, wherein said protection component is an oxide of a peptide, and
a precious metal fine-particle, wherein the precious metal fine-particle is selected from the group consisting of gold, silver, platinum and palladium,
wherein said protection component encloses said precious metal fine-particle, and
said protection component is separated from said precious metal colloid by ultracentrifugation treatment.
2. A precious metal colloid comprising:
a protection component, wherein said protection component is an oxide of a glucosamine, and
a precious metal fine-particle, wherein the precious metal fine-particle is selected from the group consisting of gold, silver, platinum and palladium,
wherein said protection component encloses said precious metal fine-particle, and
said protection component is separated from said precious metal colloid by ultracentrifugation treatment.
3. A precious metal colloid as set forth in claim 1 or 2, wherein said solution is a water solution.
4. A precious metal colloid as set forth in claim 1 or 2, wherein said solution is an alcohol solution.
5. A method for producing a precious metal fine-particle comprising the steps of:
adding a compound A expressed by the following formula (1) or (2) as a reduction agent in a solution containing a precious metal containing compound containing a precious metal selected from gold, silver, platinum and palladium;
adding an alkali for supporting a reductivity of said compound A to have pH greater than 10 in said solution; and
forming a precious metal fine-particle by a reduction reaction of a precious metal ion in said precious metal containing compound, wherein said compound A is a peptide,

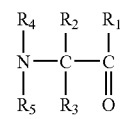

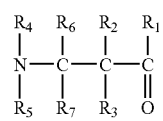

where, $R_1$ indicates a hydrogen, a hydroxyl group, an alkoxy group, an amino group, or an atomic group bonded by a peptide bonding,
each of $R_2$ and $R_3$ indicates a hydrogen, an alkyl group, or a substituted alkyl group,
each of $R_4$ and $R_5$ indicates a hydrogen, an alkyl group, a substituted alkyl group, or an acetyl group, and
each of $R_6$ and $R_7$ indicates a hydrogen, an alkyl group, or a substituted alkyl group.
6. A method for producing a precious metal fine-particle, comprising the steps of:
adding a compound A expressed by the following formula (1) or (2) as a reduction agent in a solution containing a precious metal containing compound containing a precious metal selected from gold, silver, platinum and palladium;
adding an alkali for supporting a reductivity of said compound A to have pH greater than 10 in said solution; and forming a precious metal fine-particle by a reduction reaction of a precious metal ion in said precious metal containing compound, wherein said compound A is a glucosamine compound,

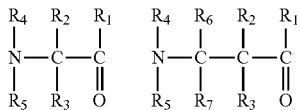

where, $R_1$ indicates a hydrogen, a hydroxyl group, an alkoxy group, an amino group, or an atomic group bonded by a peptide bonding, each of $R_2$ and $R_3$ indicates a hydrogen, an alkyl group, or a substituted alkyl group, each of $R_4$ and $R_5$ indicates a hydrogen, an alkyl group, a substituted alkyl group, or an acetyl group, and each of $R_6$ and $R_7$ indicates a hydrogen, an alkyl group, or a substituted alkyl group.

7. A method for producing a precious metal fine-particle as set forth in claim 5 or 6, wherein said solution is a water solution.

8. A method for producing a precious metal fine-particle as set forth in claim 7, wherein, in the step of forming said precious metal fine-particle, said precious metal fine-particle is dispersed in said water solution to form a precious metal colloid.

9. A method for producing a precious metal fine-particle as set forth in claim 8, further comprising the steps of separating said water solution into a precipitate and a top clear layer by centrifugation, and removing said top clear layer and extracting said precipitate after the step of forming said precious metal fine-particle and forming a precious metal colloid.

10. A method for producing a precious metal fine-particle as set forth in claim 5 or 6, wherein said solution is a solution of an organic solvent.

11. A method for producing a precious metal fine-particle as set forth in claim 10, comprising the steps of placing statically and separating said solution into a precipitate and a top clear layer, and removing said top clear layer and extracting said precipitate after the step of forming said precious metal fine-particle.

12. A method for producing a precious metal fine-particle as set forth in claim 11,
further comprising the step of adding water to said precipitate to form a water based precious metal colloid after removing said top clear layer and extracting said precipitate.

13. A method for producing a precious metal fine-particle as set forth in claim 12,
further comprising the step of concentrating said precious metal colloid after the step of forming said precious metal colloid.

14. A method for producing a precious metal fine-particle as set forth in claim 13, wherein, in the step of concentrating said precious metal colloid, a concentration is carried out by ultrafilteration.

15. A method for producing a precious metal fine-particle as set forth in claim 13, wherein, in the step of concentrating said precious metal colloid, a concentration is carried out by ultracentrifugation.

16. A method for producing a precious metal fine-particle as set forth in claim 11,
further comprising the step of adding an organic solvent protection agent in said solution, and
comprising the step of adding an organic solvent into said precipitate to form an organic solvent based precious metal colloid after removing said top clear layer and extracting said precipitate.

* * * * *